United States Patent
Ur-Rehman et al.

(10) Patent No.: US 10,624,360 B2
(45) Date of Patent: Apr. 21, 2020

(54) METHODS FOR REDUCING GLYCEMIC VALUE OF DAIRY COMPOSITIONS

(75) Inventors: Shakeel Ur-Rehman, Meridian, ID (US); Michael J. McCloskey, Demotte, IN (US)

(73) Assignee: fairlife, LLC, Chicago, IL (US)

( * ) Notice: Subject to any disclaimer, the term of this patent is extended or adjusted under 35 U.S.C. 154(b) by 0 days.

(21) Appl. No.: 12/947,764

(22) Filed: Nov. 16, 2010

(65) Prior Publication Data

US 2011/0117243 A1    May 19, 2011

Related U.S. Application Data

(60) Provisional application No. 61/261,529, filed on Nov. 16, 2009.

(51) Int. Cl.
   *A23C 9/12*    (2006.01)
   *A23C 7/04*    (2006.01)
   *A23C 9/146*   (2006.01)

(52) U.S. Cl.
   CPC ............ *A23C 9/1206* (2013.01); *A23C 7/043* (2013.01); *A23C 9/1216* (2013.01); *A23C 9/1465* (2013.01)

(58) Field of Classification Search
   CPC ....... A23C 9/12; A23C 9/1206; A23C 9/1216; A23C 2220/102; A23C 2220/104
   USPC .......................................................... 426/42
   See application file for complete search history.

(56) References Cited

U.S. PATENT DOCUMENTS

| 3,852,496 A | * | 12/1974 | Weetall et al. ................. 426/41 |
| 2005/0214409 A1 | * | 9/2005 | Tossavainen et al. .......... 426/34 |
| 2006/0216401 A1 | * | 9/2006 | Haisman et al. ............. 426/658 |

* cited by examiner

*Primary Examiner* — Jeffrey P Mornhinweg
(74) *Attorney, Agent, or Firm* — Winstead PC

(57) ABSTRACT

The present invention relates to a process for the production of a dairy composition from a starting material containing lactose. The present invention also relates to the compositions produced by the process of the invention as well as the foods and drinks containing the compositions.

12 Claims, No Drawings

METHODS FOR REDUCING GLYCEMIC VALUE OF DAIRY COMPOSITIONS

CROSS-REFERENCES TO RELATED APPLICATIONS

The present application claims the benefit of U.S. Provisional Patent Application No. 61/261,529 filed Nov. 16, 2009.

FIELD OF THE INVENTION

The present invention relates to a process for the production of a dairy composition from a starting material containing lactose. The present invention also relates to the compositions produced by the process of the invention as well as the foods and drinks containing the compositions.

BACKGROUND OF THE INVENTION

Compositions comprising a mixture of sugars, such as lactose, glucose, galactose, fructose etc. are useful as food and drink additives in commercial food and drink production. For example, compositions comprising approximately 1-30% galactose, 1-30% fructose and 1-30% glucose are useful in the manufacture of sports drinks and energy snacks for sportsmen, confectionery, or for people having special food requirements such as diabetics.

Known processes for producing such a composition include simple admixing of individual purified sugars in the required amount. However, sugars in their pure form may be quite expensive, and the purity and therefore quality for each sugar may vary from source to source, resulting in variability of the end composition.

Other processes include one or more enzyme conversions of complex sugars to simple sugars thereby producing a mixture of at least two sugars. Simple sugars are generally sweeter than complex sugars. Additional sugars may then be added from a purified source to complete the desired composition.

However, it is important to maintain the glycemic value of a composition as low as possible so that the blood sugar level of an individual consuming the composition does not increase.

It is therefore an object of the present invention to provide a process for producing a composition comprising a mixture of sugars including galactose and fructose and/or to provide a cheap and convenient method of producing a dairy composition having a high level of sweetness, while having a reduced glycemic value relative to the starting material.

SUMMARY OF THE INVENTION

The present invention provides a process for the production of a composition having high sweetness and low glycemic value relative to glucose. Preferably the composition comprises galactose and fructose.

In a first embodiment, the invention provides a process comprising the steps: (i) hydrolysis of lactose to produce glucose and galactose; and (ii) isomerization of the glucose to fructose.

The process may be carried out as a continuous, semi-continuous, batch, sequence batch or single-batch process.

In a second embodiment, the invention provides a food or drink containing the composition of the invention, and particularly a sports drink having high level of sweetness and a low glycemic value.

DETAILED DESCRIPTION OF EXEMPLARY EMBODIMENTS

The present invention is concerned with a process for the production of a composition comprising a mixture of galactose and fructose. Such compositions are particularly useful in the preparation of sports drinks as a source of readily absorbable energy before, during or after exercise.

In a first embodiment the present invention provides a process comprising the steps: hydrolysis of lactose to produce glucose and galactose; and isomerization of the glucose to fructose.

The process may be carried out as a continuous, semi-continuous, batch, sequenced batch or single-batch process.

The lactose source may be selected from the group comprising milk; UF permeate derived from whole milk, skim milk, whey or milk serum; pure lactose; whey; deproteinated whey; demineralised whey; decalcified whey; UF permeate derived from deproteinised, demineralised or decalcified whey; or any combination thereof.

The hydrolysis step may be achieved chemically, including the use of acids, strong cation exchange resins, or enzymatically using one or more hydrolytic enzymes, or in a bioreactor.

The acids may comprise a weak solution (0.001-0.1% of total weight of lactose) of one or more acids selected from strong mineral acids such as hydrochloric acid, sulphuric acid, phosphoric acid or nitric acid, and/or organic acids such as citric acid.

The hydrolytic enzyme (beta-galactosidase, also known as lactase) may be free or immobilized and may be sourced from *Kluyveromyces lactis*, *Kluyveromyces fragilis*, *Kluyveromyces marxianus*, *Saccharomyces fragilis*, *Streptococcus thermophilus*, *Aspergillus oryzae*, *Aspergillus niger*, *Lactobacillus bulgaricus*, *Lactobacillus helviticus*, *Lactobacillus salivarius*, *Lactobacillus fermentum*, *Lactobacillus casei*, *Lactobacillus acidophilus*, *Steptococcus lactis*, *Bifidobacterium bifidum*, *Bifidobacterium longum*, *Bifidobacterium adolescentis*, *Bifidobacterium breve*, *Bacillus subtilis*, *Escherichia coli*, *Sulfolobus* species, especially *Sulfolobus solfataricus*, *Pyrococcus fusiosus*, green coffee beans, jack beans, bovine liver, and bovine testes and any other suitable source either alone or in combination.

The hydrolysis reaction mixture is maintained under suitable conditions according to the source of the enzyme, its activity, temperature and pH optima and the amount of starting material as understood by a skilled person and as set out in the manufacturers' instructions. For *Kluyveromyces*-derived enzyme, the reaction mixture is maintained at pH 6.8-7.5 preferably 7.1-7.3, most preferably 7.2 using acid or alkali as required (e.g. NaOH, KOH, HCl, $KH_2PO_4$, $K_2HPO_4$, potassium or sodium citrate, magnesium carbonate, sulphuric acid, citric acid or a mixture thereof) and at 40-50° C. for approximately 8 hours. For *Aspergillus*-derived enzyme the reaction mixture is maintained at pH 3.5-7.5, preferably 4.5-7.0 and at 40-60° C.

The isomerization step may be achieved chemically or enzymatically. When an enzyme is used, such a glucose isomerase enzyme may be free or immobilized and may be sourced from *Actinoplanes missiourensis*, *Bacillus coagulans*, *Streptomyces murinus*, *Escherichia coli* and *Arthrobacter* species. Again the reaction conditions are dependant on the source of the enzyme and manufacturers' recommendations may be followed. Generally, preferred conditions are similar to those used in the industrial production of high fructose corn syrup where starch derived dextrose is converted to a fructose/dextrose mixture. For the present invention, general conditions are 55-62° C. and 0.5-5 bed volumes/hour.

This step may be carried out in a membrane bioreactor. Preferably, this step carried out using an immobilized enzyme in a column format.

Simple sugars like glucose have a high glycemic value or glycemic index (100) because they go directly into the blood stream for energy. On the other hand, sugars like galactose and fructose are converted into glucose via the liver and do not contribute directly to the increase of the blood sugar level. The glycemic values of galactose and fructose are 19, while that of lactose is 46.

In an embodiment of the invention, a dairy composition having a protein content of 4.5% and a lactose content of 1.5% is prepared. The lactose in the composition is hydrolyzed to glucose and galactose using lactase enzyme. The glucose content is further isomerized to fructose using glucose isomerase to increase the sweetness and reduce glycemic value. The sweetness value of fructose is twice that of glucose. Embodiments of the claimed invention assist in making a dairy product that is suitable for consumption by diabetics, wherein the product has the sweetness of ordinary milk, but has a sugar content that is 65-70% less than ordinary milk. Embodiments of the invention permit diabetic people to consume a milk product for their protein and calcium needs that tastes the same as ordinary milk without the same sugar load as ordinary milk. The fructose content of a dairy product made by an embodiment of the invention is less than 0.65%. The diabetic-friendly milk product may be prepared as a low fat product or a fat-free product.

An embodiment of the invention is directed to a composition having a glycemic value or glycemic index of 18-21, which is 18-21% of the glycemic value of glucose. An embodiment of the invention is directed to a dairy product having a sweetness value that is 1.73 to 3.35 times sweeter than sucrose.

It is often desirable for sports drinks and sports foods generally to have a relatively low glycemic index and the presence of sugars other than glucose, or sugars which may be converted to glucose in the small intestine, is therefore important when formulating such drinks and foods. Galactose, for example, acts to reduce the glycemic index in a sports drink or food bar. It is a key feature of the present invention that it provides further reduction of the glycemic index through the isomerization of highly glycemic glucose to fructose.

With respect to the relative sweetness of sugars, based on sucrose having a value of 100%, fructose has a sweetness value of 173% relative to sucrose (i.e., 1.73 times), glucose has a sweetness of 74%, galactose has a sweetness of 335% (i.e., 3.35 times) and lactose has a sweetness of 16%. Similarly, with respect to glycemic values based on glucose having a value of 100, fructose has a glycemic value of 19 relative to glucose, galactose has a glycemic value of 19 and lactose has a glycemic value of 46.

Table 1 shows the effect of addition of different levels of glucose isomerase enzyme (GI) on the isomerization of glucose to fructose in pasteurized lactose hydrolyzed milk, LHM (2.0% fat; 2.4% hydrolyzed lactose and 5.2% protein). The lactose is converted to glucose and galactose by addition of lactase enzyme before the addition of glucose isomerase enzyme.

TABLE 1

| Treatment | Glucose (%) | Fructose (%) | % Isomerization |
|---|---|---|---|
| Control, no GI to LHM | 1.2 | 0.0 | 0.0 |
| 22.6 mL GI per gallon of LHM and held at 21° C. for 2.5 hours followed by storage at <4° C. for 24 hours. | 0.7 | 0.5 | 42 |
| 8 mL GI per gallon of LHM and held at 21° C. for 2.5 hours followed by storage at <4° C. for 24 hours. | 0.8 | 0.4 | 33 |
| 22.6 mL GI per gallon and held at 4° C. for 2.5 hours followed by storage at <4° C. for 24 hours. | 0.9 | 0.3 | 25 |

The invention claimed is:

1. A process for producing a diabetic-friendly dairy product having a low glycemic value comprising the steps of:
   preparing a composition comprising a lactose source, the composition having a protein content of 4.5% and a lactose content of 1.5%;
   treating the lactose source with lactase in a hydrolysis step to form a dairy composition containing glucose and galactose that are derived from hydrolysis of lactose;
   treating the dairy composition with glucose isomerase in an isomerization step to convert glucose into fructose, and wherein calcium ions are not removed from the dairy composition prior to the isomerization step and a pH of the dairy composition is not altered prior to the isomerization step, wherein the isomerization step is carried out at 21° C. for 2.5 hours;
   producing the diabetic-friendly dairy product with the treated dairy composition, the diabetic-friendly dairy product having a fructose content ranging from 0.3 wt % to 0.5 wt %, wherein the fructose content is a result of the isomerization step; and
   wherein the glucose produced in the hydrolysis step is not subjected to an oxidation step.

2. The process of claim 1, wherein the lactase is obtained from one of the following sources: *Kluyveromyces lactis, Kluyveromyces fragilis, Kluyveromyces marxianus, Saccharomyces fragilis, Streptococcus thermophilus, Aspergillus oryzae, Aspergillus niger, Lactobacillus bulgaricus, Lactobacillus helviticus, Lactobacillus salivarius, Lactobacillus fermentum, Lactobacillus casei, Lactobacillus acidophilus, Streptococcus lactis, Bifidobacterium bifidum, Bifidobacterium longum, Bifidobacterium adolescentis, Bifidobacterium breve, Bacillus subtilis, Escherichia coli, Sulfolobus species, Pyrococcus fusiosus*, green coffee beans, jack beans, bovine liver, and bovine testes either alone or in combination.

3. The process of claim 1, wherein said glucose isomerase is obtained from *Actinoplanes missiourensis, Bacillus coagulans, Streptomyces murinus, Escherichia coli* or *Arthrobacter* species, either alone or in combination.

4. The process of claim 1, wherein the diabetic-friendly dairy product has the sweetness of milk with a sugar content that is 65-70% less than milk.

5. The process of claim 1, wherein the treating the dairy composition with glucose isomerase comprises adding 22.6 mL of glucose isomerase per gallon of the lactose source.

6. The process of claim 5, wherein the diabetic-friendly dairy product comprises approximately 0.7% glucose and approximately 0.5% fructose.

7. The process of claim 5, wherein the diabetic-friendly dairy product comprises approximately 0.9% glucose and approximately 0.3% fructose.

8. The process of claim 1, wherein the treating the dairy composition with glucose isomerase comprises adding 8 mL of glucose isomerase per gallon of the lactose source.

9. The process of claim 8, wherein the diabetic-friendly dairy product comprises approximately 0.8% glucose and approximately 0.4% fructose.

10. The process of claim 1, wherein, after the isomerization step, the dairy composition is stored at less than 4° C. 24 hours.

11. A process for producing a diabetic-friendly dairy product having a low glycemic value comprising the steps of:
 preparing a composition comprising a lactose source, the composition having a protein content of 4.5% and a lactose content of 1.5%;
 treating the lactose source with lactase in a hydrolysis step to form a dairy composition containing glucose and galactose that are derived from hydrolysis of lactose;
 treating the dairy composition with glucose isomerase in an isomerization step to convert glucose into fructose, and wherein calcium ions are not removed from the dairy composition prior to the isomerization step and a pH of the dairy composition is not altered prior to the isomerization step, wherein the isomerization step is carried out at 4° C. for 2.5 hours;
 producing the diabetic-friendly dairy product with the treated dairy composition, the diabetic-friendly dairy product having a fructose content ranging from 0.3 wt % to 0.5 wt %, wherein the fructose content is a result of the isomerization step; and
 wherein the glucose produced in the hydrolysis step is not subjected to an oxidation step.

12. The process of claim 11, wherein, after the isomerization step, the dairy composition is stored at less than 4° C. 24 hours.

\* \* \* \* \*